United States Patent
Aggarwal

(10) Patent No.: US 9,723,216 B2
(45) Date of Patent: Aug. 1, 2017

(54) METHOD AND SYSTEM FOR GENERATING AN IMAGE INCLUDING OPTICALLY ZOOMED AND DIGITALLY ZOOMED REGIONS

(71) Applicant: NVIDIA Corporation, Santa Clara, CA (US)

(72) Inventor: Rajat Aggarwal, Nagpur (IN)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 14/180,036

(22) Filed: Feb. 13, 2014

(65) Prior Publication Data

US 2015/0229848 A1    Aug. 13, 2015

(51) Int. Cl.
*H04N 5/232* (2006.01)
*H04N 5/265* (2006.01)
*H04N 5/272* (2006.01)

(52) U.S. Cl.
CPC ......... *H04N 5/23296* (2013.01); *H04N 5/265* (2013.01); *H04N 5/272* (2013.01)

(58) Field of Classification Search
CPC ............... H04N 5/23296; H04N 5/265; H04N 5/23267; H04N 5/2327; H04N 5/23274; H04N 5/23277; H04N 5/2329; H04N 5/2328; H04N 3/1593; H04N 5/3415; H04N 5/23; G06T 7/0024; G06T 7/0038; G03B 2205/0007; G03B 2205/0023; G03B 2205/0038; G02B 27/64; G02B 27/646
See application file for complete search history.

(56) References Cited

U.S. PATENT DOCUMENTS

| | | | |
|---|---|---|---|
| 5,534,934 | A | 7/1996 | Katsumata et al. |
| 5,537,149 | A | 7/1996 | Teraoka et al. |
| 5,572,343 | A | 11/1996 | Okamura et al. |
| 5,953,691 | A | 9/1999 | Mills |
| 6,538,658 | B1 | 3/2003 | Herrera |
| 6,757,022 | B2 | 6/2004 | Wredenhagen et al. |

(Continued)

FOREIGN PATENT DOCUMENTS

| | | |
|---|---|---|
| CN | 101197957 | 6/2008 |
| JP | H103089678 | 4/1991 |

(Continued)

OTHER PUBLICATIONS

Yan-Qing Lu, Fang Du, Yi-Hsin Lin, Shin-Tson Wu; "Variable Optical Attenuator Based on Polymer Stabilized wisted Nematic Liquid Crystal"; Opt. Express 12, pp. 1221-1227; Published Apr. 5, 2004.

*Primary Examiner* — Mekonnen Dagnew

(57) ABSTRACT

A method for generating images. The method includes capturing first image data representing a first scene taken optically at a first magnification index, wherein the first image data comprises a first region of an image. The method includes capturing second image data representing a second scene taken optically at a second magnification index that is less than the first magnification index, wherein the second image data comprises a second region of the image. The method includes digitally zooming the second image data in the second region to the first magnification index. The method includes digitally stitching the second image data in the second region to the first image data in the first region.

20 Claims, 9 Drawing Sheets

(56) References Cited

U.S. PATENT DOCUMENTS

| | | |
|---|---|---|
| 6,825,851 B1 | 11/2004 | Leather |
| 6,828,987 B2 | 12/2004 | Swan |
| 6,868,189 B1 | 3/2005 | Hoshino |
| 6,933,954 B2 | 8/2005 | Senior et al. |
| 6,958,780 B1 | 10/2005 | Kawai |
| 6,970,204 B1 | 11/2005 | Aida et al. |
| 7,317,827 B2 | 1/2008 | Munsil |
| 7,511,714 B1 | 3/2009 | Amann et al. |
| 7,639,208 B1 | 12/2009 | Ha et al. |
| 9,218,792 B2 | 12/2015 | Dutta et al. |
| 2002/0145610 A1 | 10/2002 | Barilovits et al. |
| 2002/0177481 A1 | 11/2002 | Kitsutaka |
| 2003/0001868 A1 | 1/2003 | Sack et al. |
| 2003/0030653 A1 | 2/2003 | Swan |
| 2003/0189581 A1 | 10/2003 | Nasoff et al. |
| 2003/0201994 A1 | 10/2003 | Taylor et al. |
| 2003/0234795 A1 | 12/2003 | Lee |
| 2004/0075671 A1 | 4/2004 | Vale et al. |
| 2004/0119886 A1 | 6/2004 | Cook et al. |
| 2004/0145595 A1 | 7/2004 | Bennett |
| 2004/0246257 A1 | 12/2004 | MacInnis et al. |
| 2005/0063586 A1 | 3/2005 | Munsil et al. |
| 2006/0164441 A1 | 7/2006 | Wada et al. |
| 2007/0070083 A1 | 3/2007 | Fouladi et al. |
| 2007/0097261 A1 | 5/2007 | Smith et al. |
| 2007/0132788 A1 | 6/2007 | Heo |
| 2007/0195194 A1 | 8/2007 | Op De Beeck |
| 2007/0198941 A1 | 8/2007 | Baar et al. |
| 2008/0012880 A1 | 1/2008 | Plut |
| 2008/0018555 A1 | 1/2008 | Kuo et al. |
| 2009/0097092 A1 | 4/2009 | Luebke et al. |
| 2009/0128644 A1* | 5/2009 | Camp et al. ............... 348/218.1 |
| 2010/0321471 A1* | 12/2010 | Casolara ..................... 348/36 |
| 2013/0278631 A1 | 10/2013 | Border et al. |
| 2013/0300911 A1 | 11/2013 | Beckman |

FOREIGN PATENT DOCUMENTS

| | | |
|---|---|---|
| JP | 2002064760 | 2/2002 |
| JP | 2003189266 | 7/2003 |
| JP | 2005333380 | 12/2005 |
| JP | 2006135410 | 5/2006 |
| JP | 2007124232 | 5/2007 |
| JP | 2007129728 | 5/2007 |
| JP | 2008122800 | 5/2008 |
| JP | 2009162947 | 7/2009 |
| KR | 10-2006-0005578 | 1/2006 |
| KR | 20060005578 | 1/2006 |
| KR | 10-2008-0012609 | 2/2008 |
| KR | 20080012609 | 2/2008 |

* cited by examiner

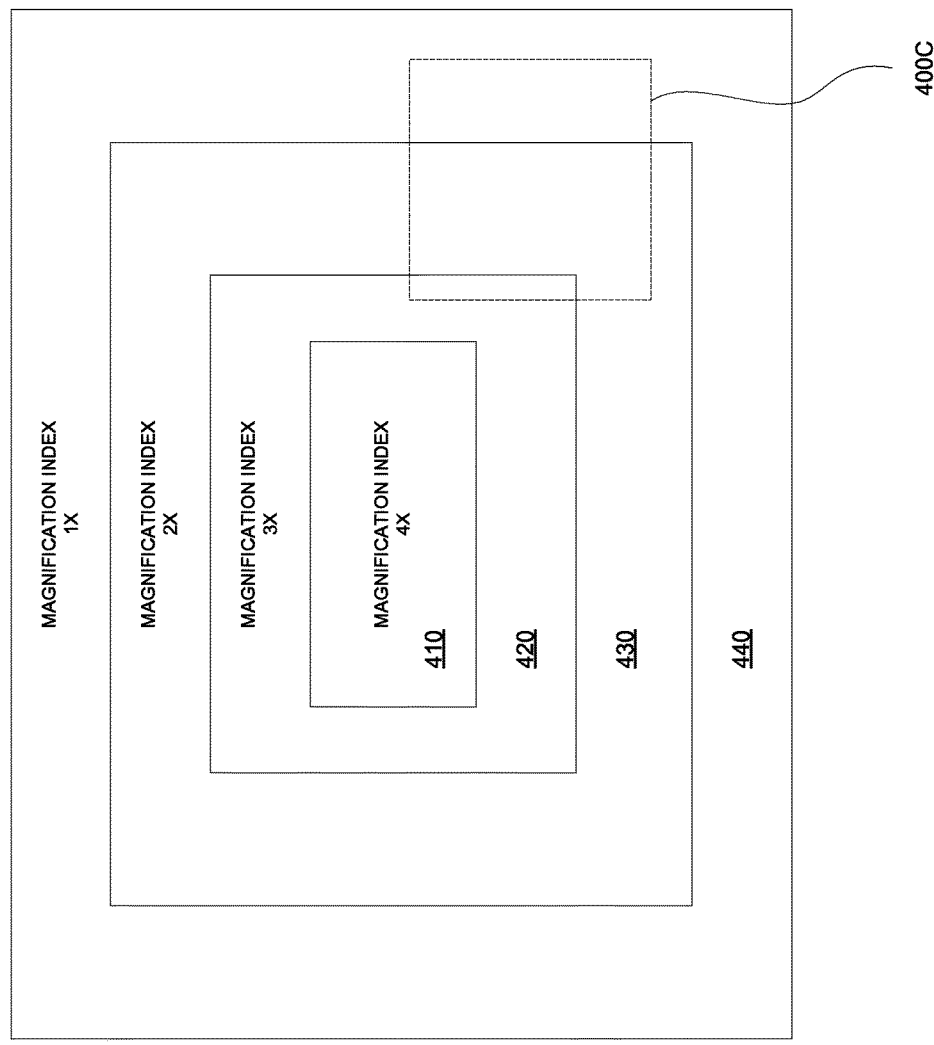

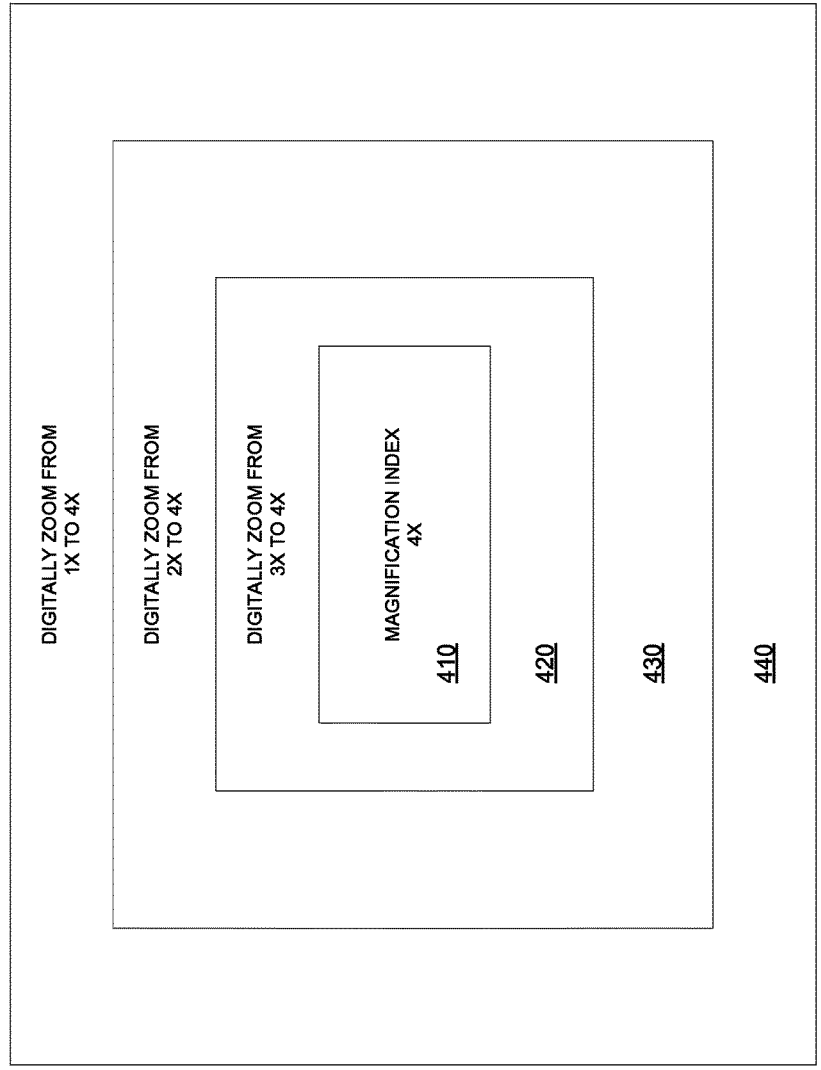

METHOD AND SYSTEM FOR GENERATING AN IMAGE INCLUDING OPTICALLY ZOOMED AND DIGITALLY ZOOMED REGIONS

BACKGROUND

A wide-angle view of a still image taken by a camera captures a large space. In one case, the image is captured at low optical magnification indices to capture as much of the three dimensional real space as possible. In another case, the image is captured using higher optical magnification indices, but the image does not capture as much of the three dimensional real space. Selecting one magnification over the other when capturing the image presents drawbacks. For example, while the wide-angle view captures more of the image, some drawbacks appear when trying to zoom in on the image due to pixilation. Also, when selecting a larger magnified view for the captured image, a drawback appears when trying to zoom out on the image due to a lack of information.

In one case, if a user were to digitally zoom in on a portion of the still image, the resulting magnified view may be pixilated due to the fact that a digital zoom process does not capture any additional detail than the maximum optical zoom used to capture the original image. Instead, when zooming in to the portion of the still image, interpolation is used to make a portion of the image larger by adding extra pixels. Interpolation still cannot replace the actual image data and results in a pixilated view upon magnification.

In another case, the still image could be taken under greater magnification index. However, outlying regions of the three dimensional real space are not captured when the original image is taken with greater magnification. As such, once the image is captured, details that were never captured cannot thereafter be recreated, even when using photo editing software. That is, the user can only zoom out on the originally captured still image to a lesser magnification.

As a result, the user is left with making a choice between capturing a still image captured with a low magnification index and living with pixilation when zooming in to a greater magnification, or capturing an image initially with a higher magnification index but leaving out some part of the three dimensional real space.

SUMMARY

In embodiments of the present invention, a computer implemented method for generating images is described. The method includes capturing first image data representing a first scene that is taken optically at a first magnification index. The first image data comprises a first region of an image. The method includes capturing second image data representing a second scene that is taken optically at a second magnification index. The second magnification index is less than the first magnification index. The second image data comprises a second region of the image. The method includes digitally zooming the second image data in the second region to the first magnification index. The method includes digitally stitching the second image data in the second region to the first image data in the first region.

In other embodiments of the present invention, an apparatus for generating images is disclosed. The apparatus includes a processor for generating image data of an image, and memory coupled to the processor that is configured for storing the image data. More particularly, the image data comprises a first region including first image data representing a first scene taken optically at a first magnification index. The image data further includes a second region of the image. The second region includes second image data representing a second scene taken optically at a second magnification index that is less than the first magnification index. The second image data in the second region is digitally zoomed to the first magnification index and digitally stitched to the first image data in the first region.

In other embodiments of the present invention, a non-transitory computer-readable medium is disclosed having computer-executable instructions for causing a computer system to perform a method for generating images. The method includes capturing first image data representing a first scene that is taken optically at a first magnification index. The first image data comprises a first region of an image. The method includes capturing second image data representing a second scene that is taken optically at a second magnification index. The second magnification index is less than the first magnification index. The second image data comprises a second region of the image. The method includes digitally zooming the second image data in the second region to the first magnification index. The method includes digitally stitching the second image data in the second region to the first image data in the first region.

In still other embodiments of the present invention, a computer system is disclosed comprising a processor and memory coupled to the processor and having stored therein instructions that, if executed by the computer system, cause the computer system to execute a method for generating images. The method includes capturing first image data representing a first scene that is taken optically at a first magnification index. The first image data comprises a first region of an image. The method includes capturing second image data representing a second scene that is taken optically at a second magnification index. The second magnification index is less than the first magnification index. The second image data comprises a second region of the image. The method includes digitally zooming the second image data in the second region to the first magnification index. The method includes digitally stitching the second image data in the second region to the first image data in the first region.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

FIG. 4A is a diagram of an overall image with multiple regions, wherein each region is taken optically using a different magnification index, in accordance with one embodiment of the present disclosure.

FIG. 4B is a diagram of an overall image captured in FIG. 4A with multiple regions that are optically zoomed to a desired magnification index and/or digitally zoomed to the desired magnification index, in accordance with one embodiment of the present disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "capturing," "digitally zooming," "digitally stitching," or the like, refer to actions and processes (e.g., flowchart 300 of FIG. 3) of a computer system or similar electronic computing device or processor (e.g., system 100). The computer system or similar electronic computing device manipulates and transforms data represented as physical (electronic) quantities within the computer system memories, registers or other such information storage, transmission or display devices.

Figure 3:
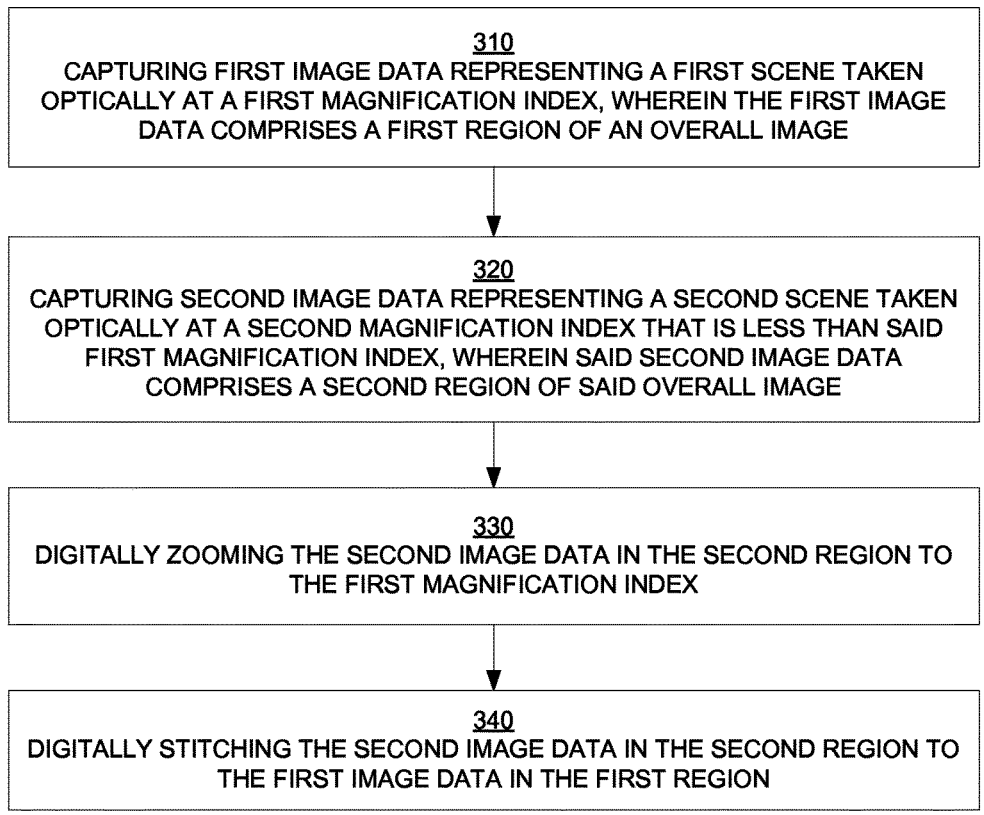
FIG. 3 is a flow diagram illustrating a method for generating an image displayable at a desired magnification index including regions that are optically zoomed to the desired magnification index and/or digitally zoomed to the desired magnification index, in accordance with one embodiment of the present disclosure.

For example, FIG. 3 is a flowchart of an example of a computer-implemented method for multi-threaded stream capture and replay according to embodiments of the present invention. Although specific steps are disclosed in the flowcharts, such steps are exemplary. That is, embodiments of the present invention are well-suited to performing various other steps or variations of the steps recited in the flowcharts.

Other embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

Figure 1:
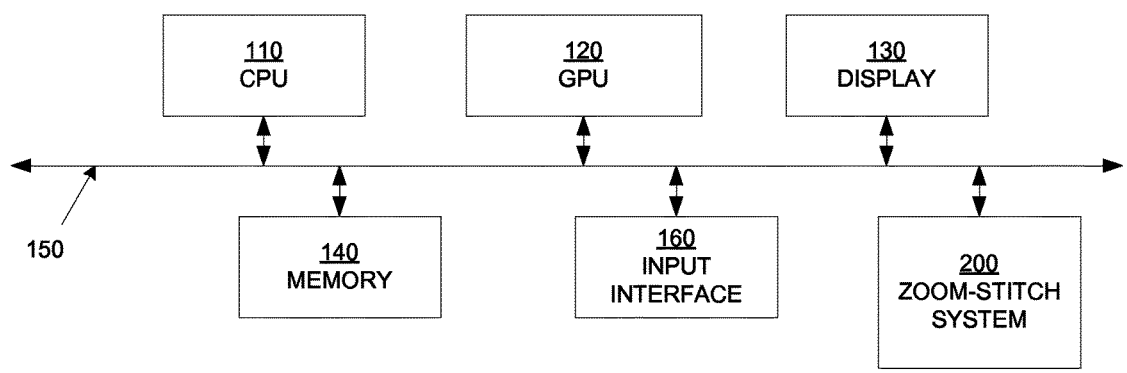
FIG. 1 depicts a block diagram of an exemplary computer system suitable for implementing the present methods, in accordance with one embodiment of the present disclosure.

FIG. 1 is a block diagram of an example of a computing system 100 capable of implementing embodiments of the present disclosure. Computing system 100 broadly represents any single or multi-processor computing device or system capable of executing computer-readable instructions. Examples of computing system 100 include, without limitation, workstations, laptops, client-side terminals, servers, distributed computing systems, handheld devices, or any other computing system or device. In its most basic configuration, computing system 100 may include at least one processor 110 and a system memory 140.

Both the central processing unit (CPU) 110 and the graphics processing unit (GPU) 120 are coupled to memory 140. System memory 140 generally represents any type or form of volatile or non-volatile storage device or medium capable of storing data and/or other computer-readable instructions. Examples of system memory 140 include, without limitation, RAM, ROM, flash memory, or any other suitable memory device. In the example of FIG. 1, memory 140 is a shared memory, whereby the memory stores instructions and data for both the CPU 110 and the GPU 120. Alternatively, there may be separate memories dedicated to the CPU 110 and the GPU 120, respectively. The memory can include a frame buffer for storing pixel data drives a display screen 130.

The system 100 includes a user interface 160 that, in one implementation, includes an on-screen cursor control device. The user interface may include a keyboard, a mouse, and/or a touch screen device (a touchpad). System 100 also includes a system 200 that is configured for generating an image displayable at a particular magnification index comprising regions originally captured at the desired magnification index and/or regions originally captured optically at a magnification index that is lower than the desired magnification index, but digitally zoomed to the described magnification index. System 200 is further described in FIG. 2 below.

CPU 110 and/or GPU 120 generally represent any type or form of processing unit capable of processing data or interpreting and executing instructions. In certain embodiments, processors 110 and/or 120 may receive instructions from a software application or hardware module. These instructions may cause processors 110 and/or 120 to perform the functions of one or more of the example embodiments described and/or illustrated herein. For example, processors 110 and/or 120 may perform and/or be a means for performing, either alone or in combination with other elements, one or more of the monitoring, determining, gating, and detecting, or the like described herein. Processors 110 and/or 120 may also perform and/or be a means for performing any other steps, methods, or processes described and/or illustrated herein.

In some embodiments, the computer-readable medium containing a computer program may be loaded into computing system 100. All or a portion of the computer program stored on the computer-readable medium may then be stored in system memory 140 and/or various portions of storage devices. When executed by processors 110 and/or 120, a computer program loaded into computing system 100 may cause processor 110 and/or 120 to perform and/or be a means for performing the functions of the example embodiments described and/or illustrated herein. Additionally or alternatively, the example embodiments described and/or illustrated herein may be implemented in firmware and/or hardware.

Throughout the present Application, the terms "optical zoom" and digital zoom are used. The term "optical zoom" is describing a process of magnifying an image that is captured, wherein the magnification uses the lenses of a camera to bring far objects closer while maintaining image quality. The term "digital zoom" describes a digital process of magnifying the image, that actually crops the captured image reducing the number of pixels having captured image data, and performs interpolation to fill in spaces without image data to compose a magnified image, thereby reducing image quality.

Accordingly, embodiments of the present invention provide apparatus and methods for generating an image comprising regions originally captured at a desired magnification index and/or digitally zoomed to the desired magnification index. Other embodiments of the present invention provide the above accomplishments and further provide for magnifying a selected area of an image while minimizing pixilation. Still other embodiments of the present invention provide the above accomplishments and further provide for zooming out in an image at high magnification indices.

Figure 2:
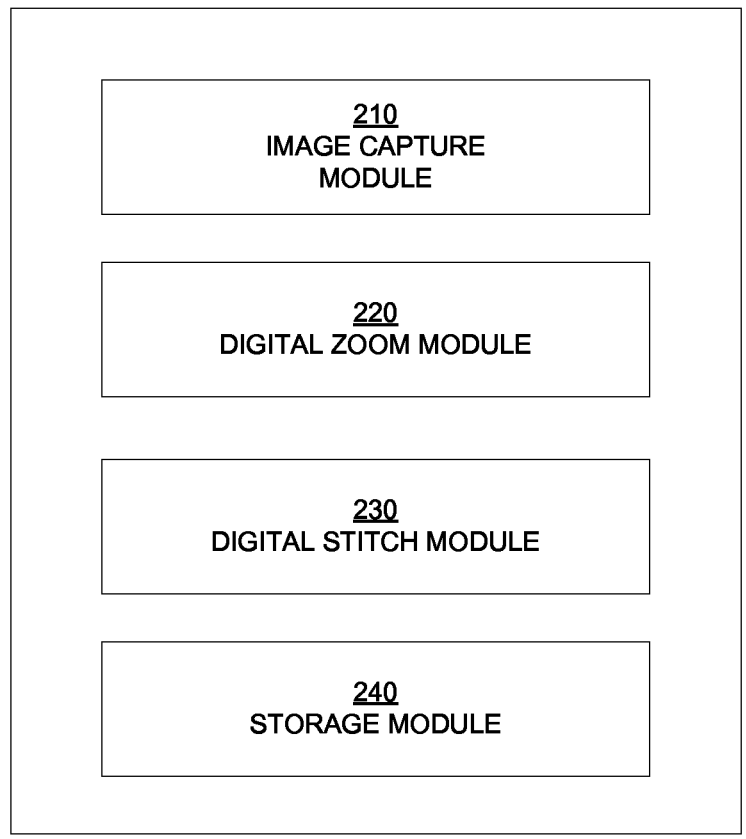
FIG. 2 is a block diagram of an apparatus configured to generate an image displayed at a desired magnification index comprising regions that are optically zoomed to the desired magnification index and/or digitally zoomed to the desired magnification index, in accordance with one embodiment of the present disclosure.

FIG. 2 is a block diagram of an image capturing/generating apparatus 200 configured to generate an image displayed at a desired magnification index comprising regions that are optically zoomed to the desired magnification index and/or digitally zoomed to the desired magnification index, in accordance with one embodiment of the present disclosure.

As shown, apparatus 200 includes an image capture module 210. Image capture module is capable of capturing one or more at one or more magnification indices using optical zoom techniques. These images are combined to form an overall image. For instance, when capturing images of three dimensional (3D) real space, the image capture module 210 is able to capture first image data representing a first scene of the 3D real space, wherein the first image is taken using a first magnification index. In addition, the image capture module 210 is able to capture second image data representing a second scene of the 3D real space, wherein the second image is taken using a second magnification index.

The first magnification index has a higher value than the second magnification index, in one embodiment. For example, the first image comprises a first region of the overall image taken at a higher magnification, and the second image data comprises a second region of the overall image that is taken at a lower magnification.

Apparatus 200 also includes a digital zoom module 220 that is configured to digitally zoom the second image data in the second region to the first magnification index. That is, the digital zoom module 220 digitally zooms the second image data from its originally captured second magnification index to the higher first magnification index. In that manner, both regions contain image data that is displayable at the first magnification index. More specifically, the entire area covered by both the first region and the second region now contain image data that is displayable at the first magnification index.

Apparatus 200 also includes a stitch module 230 that is configured to digitally stitch the second image data in the second region not the first image data in the first region. That is, image data for overlapping and/or adjacent areas in the first region and the second region is stitched to generate a combined image having the same magnification index, in this case the first magnification index. The digital stitch module is capable of implementing any photo stitching methodology for combining multiple digitally photographic images having adjacent or overlapping fields of view to generate a seamless, overall image at the desired magnification index.

Apparatus 200 also includes a storage module 240. For instance, each of the images captured by the image capture module 210 is stored in storage module 240. As an example, when five images of a scene are captured using a burst mode, each taken at different image magnifications, all five images are stored in storage module 240.

FIG. 3 is a flow diagram illustrating a method and/or computer implemented method for generating an image displayable at a desired magnification index including regions that are optically zoomed to the desired magnification index and/or digitally zoomed to the desired magnification index, in accordance with one embodiment of the present disclosure. In another embodiment, flow diagram 300 is implemented within a computer system including a processor and memory coupled to the processor and having stored therein instructions that, if executed by the computer system causes the system to execute a method for generating an image displayable at a desired magnification index including regions that are optically zoomed to the desired magnification index and/or digitally zoomed to the desired magnification index. In still another embodiment, instructions for performing a method are stored on a non-transitory computer-readable storage medium having computer-executable instructions for causing a computer system to perform a method for generating an image displayable at a desired magnification index including regions that are optically zoomed to the desired magnification index and/or digitally zoomed to the desired magnification index. The method outlined in flow diagram 300 is implementable by one or more components of the computer system 100 and image capturing/generating apparatus 200 of FIGS. 1 and 2, respectively.

At 310, the method includes capturing first image data representing a first scene taken optically at a first magnification index. The first image data is taken at a first magnification index using one or more optical lenses, wherein the first image data is optically zoomed. In addition, the first image data comprises a first region of an overall image. Specifically, the first scene is defined by a first field of view, for example from an image capturing device. The first scene is part of the overall image. The first image data is stored, such as, in storage module 240.

At 320, the method includes capturing second image data representing a second scene. The second image data is taken at a second magnification index using one or more optical lenses, wherein the second magnification index is lower or less than the first magnification index. That is, the second image data is optically zoomed out. In addition, the second image data comprises a second region of the overall image. Also, the second scene is defined by a second field of view, for example from the image capturing device, wherein the second scene is part of the overall image.

In one embodiment, portions of the second scene overlaps the first scene, such that the second scene includes portions of the first scene. In that case, the second region comprising the second scene includes portions of the first region comprising the first scene. In another embodiment, the second scene includes portions that are adjacent to the first scene. In another embodiment, portions of the second scene overlap the first scene such that the second scene surrounds the first scene. In still another embodiment, portions of the second scene overlap the first scene such that the second scene includes the first scene. Various illustrations of configurations of scenes that are captured and combined into an overall image are provided in FIGS. 4 and 5.

At 330, the method includes digitally zooming the second image data in the second region to the first magnification index. The second image data is taken optically at the second magnification index, which is lower than the first magnification index. As such, using digital zoom techniques, the second image data is then digitally zoomed or magnified to the first magnification index.

At 340, the method includes digitally stitching the second image data in the second region to the first image data in the first region. In particular, the second image data in the second region is magnified to the first magnification index, and as such, image data for both the first and second regions are defined by the same magnification index. Stitching is performed on image data that is consistent and compatible, since both are defined by the same magnification index. In one embodiment, stitching is performed dynamically while the user zooms to a higher magnification index on an already captured image (e.g., the second image data). In still another embodiment, an interpolation is performed when stitching the second image data in the second region to the first image data in the first region.

In particular, when performing stitching, to improve resolution of image data in areas where there are overlapping image data taken at different optical magnification indices, higher priority is given to image data originally captured with optical zoom having a higher magnification index.

In another embodiment, when performing stitching, to improve resolution of the overall image, second image data in the second region that overlaps with image data in the first region is removed or subtracted. That is, priority is given to image data having a higher magnification index, in this case image data in the first region having the higher first magnification index.

In still another embodiment, the method includes capturing third image data representing a third scene that is taken optically at a third magnification index. The third magnification index is less than the second magnification index, and the second magnification index is less than the first magnification index. In particular, the third image data is taken at a third magnification index using one or more optical lenses, wherein the third magnification index is lower or less than the first and second magnification indices. That is, the third image data is optically zoomed. In addition, the third image data comprises a third region of the overall image. Also, the third scene is defined by a third field of view, for example from the image capturing device, wherein the third scene is part of the overall image.

Portions of the third scene overlaps the second scene, and/or portions of the first scene, in one embodiment. In another embodiment, portions of the third scene is adjacent to the second scene, and/or portions of the first scene. In still another embodiment, portions of the third scene overlaps the second scene such that the third scene includes the second scene, and/or the third scene surrounds the second scene.

In addition, the method includes digitally zooming the third image data in the third region to the desired magnification index, such as, the highest magnification index or first magnification index. In particular, the third image data is taken optically at the third magnification index, and as such, using digital zoom techniques, the third image data is then digitally zoomed or magnified to the first magnification index. In some implementations, the third image data is digitally zoomed or magnified to the second magnification index if that is the desired magnification index, as will be described in relation to FIG. 4C.

The method includes digitally stitching the third image data in the third region to the second image data in the second region, and/or to first image data in the first region. For example, the third region including the third image data may include one portion that is adjacent to the second region, and a second portion that is adjacent to the first region. As such, when stitching to create an overall image at the first magnification index, the third image data in the third region is digitally magnified or zoomed to the first magnification index. Similarly, image data in the second region is digitally magnified or zoomed to the first magnification index. In that case, image data for the first, second, and third regions are defined by the same magnification index. Stitching is performed on image data that is consistent and compatible, since all the image data are defined by the same magnification index.

In one implementation, when no magnification occurs, the user is presented with the least magnified image. That is, when one or more images of a scene are taken at a single magnification index, no zooming in is done, and the user is presented with the image as taken at that magnification index.

FIG. 4A is a diagram of an overall image 400A with multiple regions, wherein each region is taken optically using a different magnification index, in accordance with one embodiment of the present disclosure. In particular, an image capturing device captures first image data at a first magnification index of 4×, using optical zooming techniques. For example, the magnification index of 4× may be the maximum magnification index capable for the image capturing device, which means it is fully zoomed in the center of the field of view. The first image data is associated with a first scene defining a first field of view taken from the perspective of the image capturing device. The first image data is associated with a first region 420 of the overall image 400A.

In addition, second image data is captured at a second magnification index of 3× using optical zooming techniques, which is less than the magnification of the first magnification index of 4×. In general, for purposes of this example, the higher the magnification index, the higher the magnification. In one embodiment, the second magnification index is one full step down from the first magnification index. In other embodiments, the second magnification index is a fraction of a step down from the first magnification index. The second image data is associated with a second scene defining a second field of view taken from the perspective of the image capturing device. The second image data is associated with a second region 420 of the overall image 400A. Portions of the second scene in the second region 420 may overlap with the first region 410, such that portions of the second scene is hidden under the first region 410.

Further, third image data is captured at a third magnification index of 2× using optical zooming techniques, which is less than the magnification index of 3× and 4×. The third image data is associated with a third scene defining a third field of view taken from the perspective of the image capturing device. The third image data is associated with a third region 430 of the overall image 400A. Portions of the third scene in the third region 430 may overlap with the first region 410 and/or the second region 420, such that portions of the third scene is hidden under the first region 410 and/or second region.

Also, fourth image data is captured at a fourth magnification index of 1× using optical zooming techniques. The 1× magnification index implies that the camera is fully zoomed out to capture the widest or largest field of view. The fourth image data is associated with a fourth scene defining a fourth field of view taken from the perspective of the image capturing device. The fourth image data is associated with a fourth region 440 of the overall image 400A. Portions of the fourth scene in the fourth region 440 may overlap with the first region 410 and/or the second region 420 and/or the third region 430, such that portions of the fourth scene is hidden under the first region 410 and/or second region 420 and/or third region 430.

As shown in FIG. 4A, portions of the second scene overlap the first scene such that the second scene surrounds the first scene. That is, portions of the second region 420 overlaps the first region 410, such that the second region 420 surrounds the first region 410. In particular, a first center of the first scene/region 410 is approximately in the same location as a second center of the second scene/region 420.

Further, portions of the third scene overlap the second scene such that the third scene surrounds the second scene. That is, portions of the third region 430 overlaps the second region 420 such that the third region 430 surrounds the second region 420. For instance, a third center of the third scene/region 430 is approximately in the same location as the second center of the second scene/region 420.

Also, portions of the fourth scene overlap the third scene such that the fourth scene surrounds the third scene. That is, portions of the fourth region 440 overlaps the third region 430 such that the fourth region 440 surrounds the third region 430. For instance, a fourth center of the fourth scene/region 440 is approximately in the same location as the third center of the third scene/region 430.

FIG. 4B is a diagram of an overall image 400B that was originally captured in FIG. 4A and now comprising multiple regions that are optically zoomed to a desired magnification index and/or digitally zoomed to the desired magnification index, in accordance with one embodiment of the present disclosure. In particular, the overall image 400B includes first image data in the first region 410 captured at a first magnification index of 4×, using optical zooming techniques.

Additionally, the overall image 400B includes second image data in the second region 420 that was originally captured at a second magnification index of 3× and now is digitally zoomed to the desired magnification index of 4×. Also, the overall image 400B includes third image data in the third region 430 that was originally captured at a third magnification index of 2× and now is digitally zoomed to the desired magnification index of 4×. Further, the overall image 400B includes fourth image data in the fourth region 440 that was originally captured at a fourth magnification index of 1× and now is digitally zoomed to the desired magnification index of 4×.

In embodiments, the desired magnification index may be any number. Though a desired magnification index of 4× is chosen that represents the maximum magnification index possible by the image capturing device, other values for the desired magnification index are contemplated. For instance, though the maximum magnification index may be 4×, the desired magnification index may be 3× in a selected area as will be further described in relation to FIG. 4C. In this case, the image taken at 4× need not be used. Embodiments of the present invention are able to both zoom in and zoom out in a particular selected area.

Figure 4C:
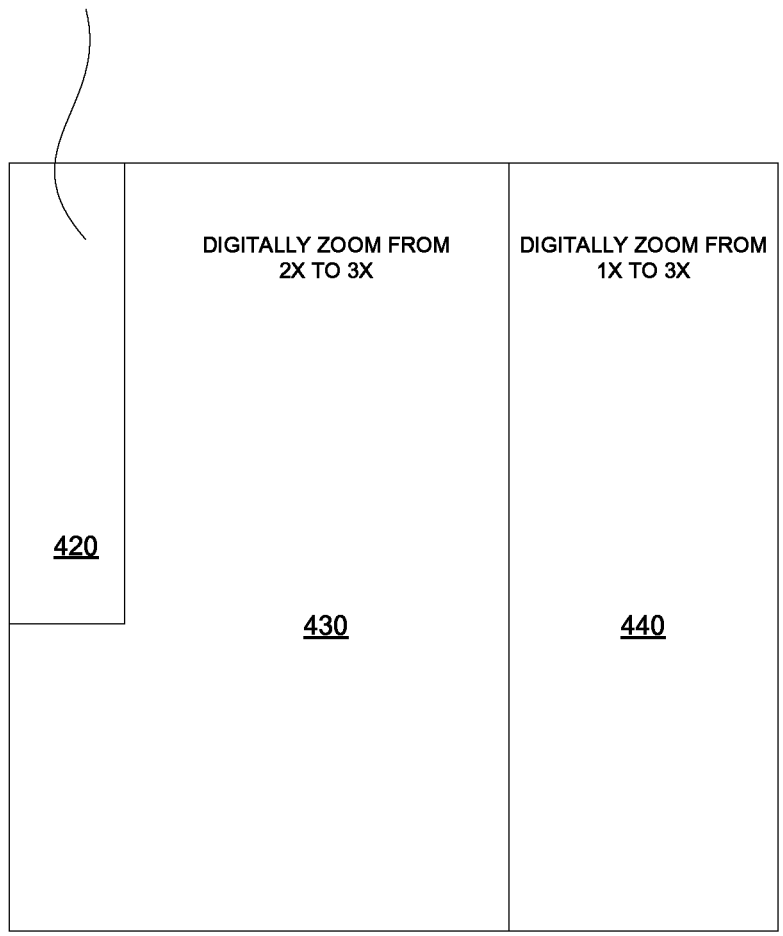
FIG. 4C is a diagram of a selected area of the image displayed in FIG. 4A, wherein the selected area includes multiple regions that are optically zoomed to a described magnification index and/or digitally zoomed to the desired magnification index, in accordance with one embodiment of the present disclosure.

FIG. 4C is a diagram of a selected area 400C of the overall image 400A displayed in FIG. 4A, wherein the selected area 400C includes multiple regions that are optically zoomed to a desired magnification index and/or digitally zoomed to the desired magnification index, in accordance with one embodiment of the present disclosure. That is, after capturing image data for the different regions in overall image 400A, a selected region 400C is chosen for isolated viewing and/or magnification, as is shown in FIG. 4A. FIG. 4C is an enlarged view of selected area 400C.

In particular, when a user defines the selected area 400C for magnification, embodiments of the present invention are able to access image data for relevant regions and stitch the different regions together to create an image for the selected area 400C at the desired magnification. That is, all regions, that were captured with lesser magnification than the desired magnification in the view of the selected area 400C, are shown digitally zoomed from their corresponding maximum captured optical zoom or magnification index to the desired magnification index. In this manner, the stitching process is manipulating image data having a consistent and desired magnification index.

For example, if a user zooms into the selected area 400C with magnification index equivalent to 3×, then the image data in the fourth region 440 as defined in the selected area 400C that is originally and optically captured at 1× is digitally zoomed to 3×. Also, image data in the third region 430 as defined in the selected area 400C that is originally and optically captured at 2× is digitally zoomed to 3×. The image data in the second region 420 as defined in the selected area 400C is captured at the desired magnification index, and does not require modification. As a result, embodiments of the present invention are able to digitally magnify image data for a selected area including regions having a wider field of view and lower magnification index to a higher, and desired magnification index.

Figure 5A:
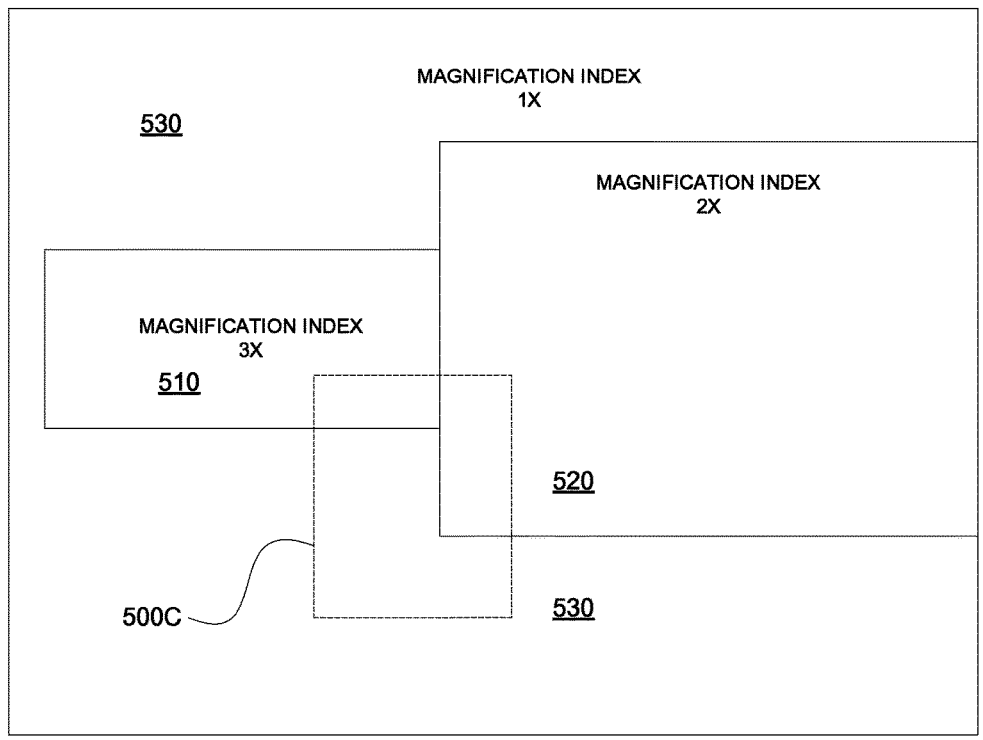
FIG. 5A is a diagram of an overall image with multiple regions, wherein each region is taken optically using a different magnification index, and wherein one region is adjacent to a second region, in accordance with one embodiment of the present disclosure.

FIG. 5A is a diagram of an overall image 500A with multiple regions, wherein each region is taken optically using a different magnification index, and wherein one region is adjacent to a second region, in accordance with one embodiment of the present disclosure. In particular, an image capturing device captures first image data at a first magnification index of 3×, using optical zooming techniques. The first image data is associated with a first scene defining a first field of view taken from the perspective of the image capturing device. The first image data is associated with a first region 510 of the overall image 500A.

In addition, second image data is captured at a second magnification index of 2× using optical zooming techniques, which is less than the magnification of the first magnification index of 3×. As before, for purposes of this example, the higher the magnification index, the higher the magnification. The second image data is associated with a second scene defining a second field of view taken from the perspective of the image capturing device. The second image data is associated with a second region 520 of the overall image 500A. Portions of the second scene in the second region 520 is adjacent to the first region 510, or slightly overlap with the first region 510.

In addition, third image data is captured at a third magnification index of 1× using optical zooming techniques, which is less than the magnification of the second magnification index of 2×. The third image data is associated with a third scene defining a third field of view taken from the perspective of the image capturing device. The third image data is associated with a third region 530 of the overall image 500A. Portions of the third scene in the third region 530 may overlap with portions of the first region 510, such that those portions are hidden behind the first region 510. Also, portions of the third scene in the third region 530 may overlap with portions of the second region 520, such that those portions are hidden behind the second region 520.

Figure 5B:
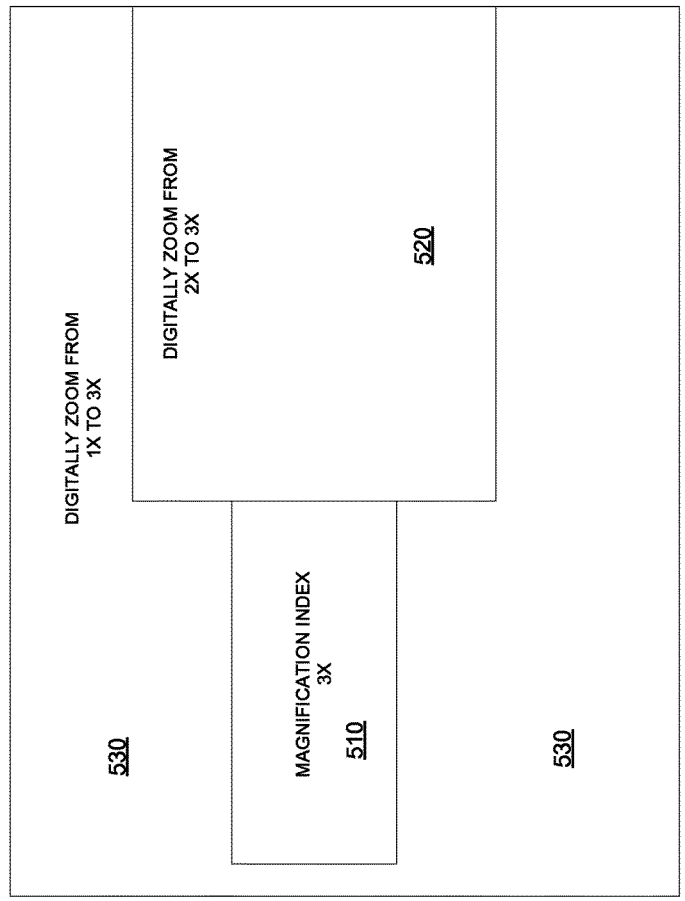
FIG. 5B is a diagram of the overall image captured in FIG. 5A with multiple regions that are optically zoomed to a desired magnification index and/or digitally zoomed to the desired magnification index, in accordance with one embodiment of the present disclosure

FIG. 5B is a diagram of the overall image 500B that was originally captured in FIG. 5A and now comprises multiple regions that are optically zoomed to a desired magnification index and/or digitally zoomed to the desired magnification index, in accordance with one embodiment of the present disclosure. In particular, the overall image 500B includes first image data in the first region 510 captured at a first magnification index of 3×, using optical zooming techniques.

Additionally, the overall image 500B includes second image data in the second region 520 that was originally captured at a second magnification index of 2× and now is digitally zoomed to the desired magnification index of 3×. Also, the overall image 500B includes third image data in the third region 530 that was originally captured at a third magnification index of 1× and now is digitally zoomed to the desired magnification index of 3×.

Figure 5C:
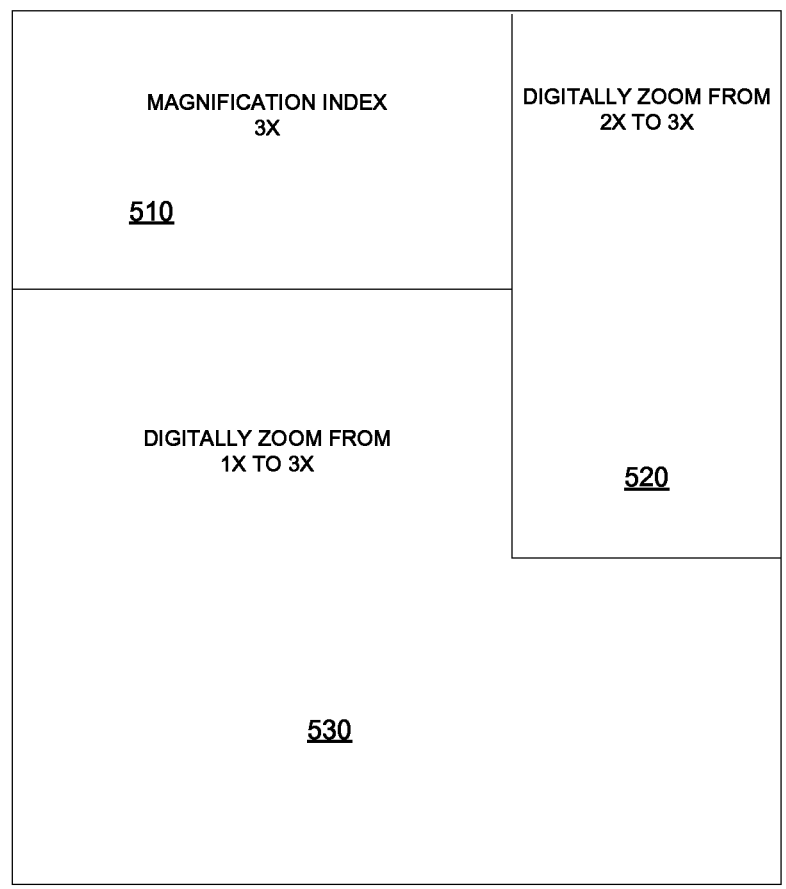
FIG. 5C is a diagram of a selected area of the overall image displayed in FIG. 5A, wherein the selected area includes multiple regions that are optically zoomed to a described magnification index and/or digitally zoomed to the desired magnification index, in accordance with one embodiment of the present disclosure.

FIG. 5C is a diagram of a selected area 500C of the overall image 500A displayed in FIG. 5A, wherein the selected area 500C includes multiple regions that are optically zoomed to a described magnification index and/or digitally zoomed to the desired magnification index, in accordance with one embodiment of the present disclosure. That is, after capturing image data for the different regions in overall image 500A, a selected region 500C is chosen for isolated viewing and/or magnification, as is shown in FIG. 5A. FIG. 5C is an enlarged view of selected area 500C.

In particular, when a user defines the selected area 500C for magnification, embodiments of the present invention are able to access image data for relevant regions and stitch the different regions together to create an image for the selected area 500C at the desired magnification. That is, all regions, that were captured with lesser magnification than the desired magnification in the view of the selected area 500C, are shown digitally zoomed from their corresponding maximum captured optical zoom or magnification index to the desired magnification index no matter their original orientation within the selected area 500C. In this manner, the stitching process is manipulating image data having a consistent and desired magnification index.

For example, if a user zooms into the selected area 500C with magnification index equivalent to 3×, then the image data in the third region 530 as defined in the selected area 500C that is originally and optically captured at 1× is digitally zoomed to 3×. Also, image data in the second region 520 as defined in the selected area 500C that is originally and optically captured at 2× is digitally zoomed to 3×. The image data in the first region 510 as defined in the selected area 500C is captured at the desired magnification index, and does not require modification. As a result, embodiments of the present invention are able to digitally magnify image data from a lower magnification index to a higher magnification index for a selected area including regions that are adjacent to and/or overlap with each other.

Thus, according to embodiments of the present disclosure, systems and methods are described providing for an image displayed at a particular magnification index comprising regions originally captured at the desired magnification index and regions originally captured optically at a magnification index that is lower than the desired magnification index, but digitally zoomed to the described magnification index.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the present disclosure are thus described. While the present disclosure has been described in particular embodiments, it should be appreciated that the disclosure should not be construed as limited by such embodiments, but rather construed according to the below claims.

What is claimed:

1. A method for generating images, comprising:
   optically capturing using a plurality of magnification indexes a plurality of image data representing a plurality of scenes associated with an overall image;
   defining a selected area of said overall image;
   selecting a desired magnification index for said selected area;
   identifying sets of image data representing portions of said selected area that are taken at or lower than said desired magnification index;
   digitally zooming any set of image data taken at less than said desired magnification index to said desired magnification index; and
   digitally stitching sets of image data together at said desired magnification index to form a desired scene of said overall image.

2. The method of claim 1, wherein said digitally zooming further comprises:
   digitally zooming a first set of image data representing a first portion of said selected area and taken optically with lesser magnification than said desired magnification index;
   digitally zooming a second set of image data representing a second portion of said selected area and taken optically with lesser magnification than said desired magnification index, wherein said first and second portions are adjacent to each other in said desired scene; and
   digitally stitching said first set of image data to said second set of image data.

3. The method of claim 2, further comprising:
   digitally zooming a third set of image data representing a third portion of said selected area and taken optically with lesser magnification than said desired magnification index;
   digitally stitching said third set of image data adjacent to said first set of image data in said desired scene; and
   digitally stitching said third set of image data adjacent to said second set of image data and said desired scene.

4. The method of claim 1, wherein said digitally zooming further comprises:
   digitally zooming a first set of image data representing a first portion of said selected area and taken optically with lesser magnification than said desired magnification index;
   identifying a second set of image data representing a second portion of said selected area and taken optically at said desired magnification index, wherein said first and second portions are adjacent to each other in said desired scene; and
   digitally stitching said first set of image data to said second set of image data.

5. The method of claim 4, further comprising:
   digitally zooming a third set of image data representing a third portion of said selected area and taken optically with lesser magnification than said desired magnification index;
   digitally stitching said third set of image data adjacent to said first set of image data in said desired scene; and
   digitally stitching said third set of image data adjacent to said second set of image data and said desired scene.

6. The method of claim 1, further comprising:
   in a portion of said selected area associated with overlapping sets of image data taken at different optical magnification indexes, prioritizing a first set of image data having a higher magnification index.

7. The method of claim 6, further comprising:
   in said portion of said selected area, subtracting image data in a second set of image data that overlaps with said first set of image data, wherein said second set of image data is taken at a lower magnification index than said first set of image data.

8. The method of claim 6, wherein said first set of image data represents a first scene, and wherein a second set of image data taken at a lower magnification index than said first set of image data represents a second scene, wherein a first center of said first scene is approximately a second center of said second scene, and wherein said second scene surrounds said first scene.

9. The method of claim 1, further comprising;
disregarding image data having a magnification index higher than said desired magnification index.

10. The method of claim 1, further comprising:
determining a maximum magnification index of said plurality of magnification indexes; and
setting said desired magnification index to said maximum magnification index.

11. A non-transitory computer-readable medium having computer-executable instructions for causing a computer system to perform a method comprising:
optically capturing using a plurality of magnification indexes a plurality of image data representing a plurality of scenes associated with an overall image;
defining a selected area of said overall image;
selecting a desired magnification index for said selected area;
identifying sets of image data representing portions of said selected area that are taken at or lower than said desired magnification index;
digitally zooming any set of image data taken at less than said desired magnification index to said desired magnification index; and
digitally stitching sets of image data together at said desired magnification index to form a desired scene of said overall image.

12. The non-transitory computer-readable medium of claim 11, wherein said digitally zooming in said method further comprises:
digitally zooming a first set of image data representing a first portion of said selected area and taken optically with lesser magnification than said desired magnification index;
digitally zooming a second set of image data representing a second portion of said selected area and taken optically with lesser magnification than said desired magnification index, wherein said first and second portions are adjacent to each other in said desired scene; and
digitally stitching said first set of image data to said second set of image data.

13. The non-transitory computer-readable medium of claim 12, wherein said method further comprises:
digitally zooming a third set of image data representing a third portion of said selected area and taken optically with lesser magnification than said desired magnification index;
digitally stitching said third set of image data adjacent to said first set of image data in said desired scene; and
digitally stitching said third set of image data adjacent to said second set of image data and said desired scene.

14. The non-transitory computer-readable medium of claim 11, wherein said digitally zooming in said method further comprises:
digitally zooming a first set of image data representing a first portion of said selected area and taken optically with lesser magnification than said desired magnification index;
identifying a second set of image data representing a second portion of said selected area and taken optically at said desired magnification index, wherein said first and second portions are adjacent to each other in said desired scene; and
digitally stitching said first set of image data to said second set of image data.

15. The non-transitory computer-readable medium of claim 11, wherein said method further comprises:
in a portion of said selected area associated with overlapping sets of image data taken at different optical magnification indexes, prioritizing a first set of image data having a higher magnification index.

16. The non-transitory computer-readable medium of claim 11, wherein said method further comprises:
disregarding image data having a magnification index higher than said desired magnification index.

17. A computer system comprising:
a processor; and
memory coupled to said processor and having stored therein instructions that, if executed by said computer system, cause said computer system to execute a method for generating images, comprising:
optically capturing using a plurality of magnification indexes a plurality of image data representing a plurality of scenes associated with an overall image;
defining a selected area of said overall image;
selecting a desired magnification index for said selected area;
identifying sets of image data representing portions of said selected area that are taken at or lower than said desired magnification index;
digitally zooming any set of image data taken at less than said desired magnification index to said desired magnification index; and
digitally stitching sets of image data together at said desired magnification index to form a desired scene of said overall image.

18. The system of claim 17, wherein said digitally zooming in said method further comprises:
digitally zooming a first set of image data representing a first portion of said selected area and taken optically with lesser magnification than said desired magnification index;
digitally zooming a second set of image data representing a second portion of said selected area and taken optically with lesser magnification than said desired magnification index, wherein said first and second portions are adjacent to each other in said desired scene; and
digitally stitching said first set of image data to said second set of image data.

19. The system of claim 17, wherein said digitally zooming in said method further comprises:
digitally zooming a first set of image data representing a first portion of said selected area and taken optically with lesser magnification than said desired magnification index;
identifying a second set of image data representing a second portion of said selected area and taken optically at said desired magnification index, wherein said first and second portions are adjacent to each other in said desired scene; and
digitally stitching said first set of image data to said second set of image data.

20. The system of claim 17, wherein said method further comprises:
disregarding image data having a magnification index higher than said desired magnification index.

* * * * *